Nov. 8, 1927.
J. R. SEATON
RAKE CLEANER
Filed Nov. 29, 1926
1,648,284
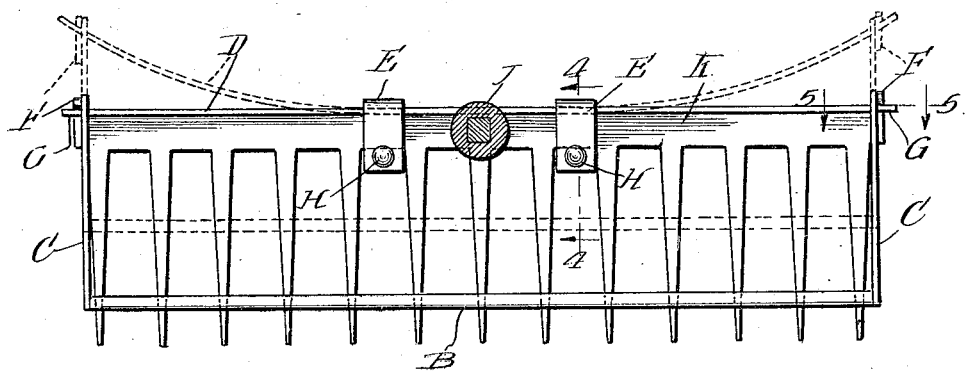
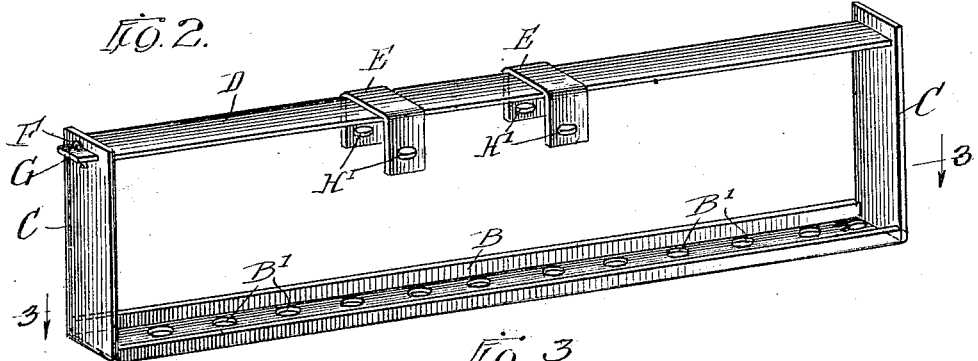
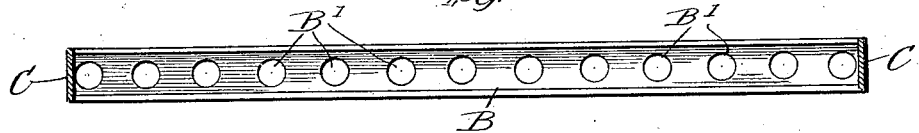
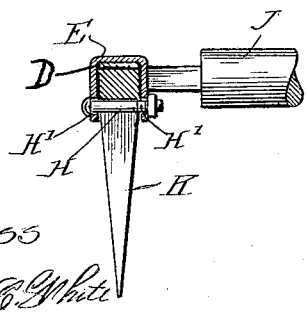
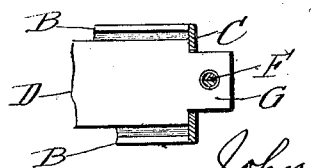
John R. Seaton
Inventor
Witness
Harry C. White Patented Nov. 8, 1927.

1,648,284

UNITED STATES PATENT OFFICE.

JOHN R. SEATON, OF CHICAGO, ILLINOIS.

RAKE CLEANER.

Application filed November 29, 1926. Serial No. 151,567.

The invention is an attachment for a rake, consisting of a horizontal bar with perforations through which the teeth of the rake pass, each end of said horizontal bar being bent upward and articulating with a flat spring clamped to the back of the rake, thereby permitting a free vertical movement of bar on the teeth of the rake. The object of the invention is to remove all accumulated grass, leaves, or other substances being raked from the teeth of the rake at the end of each stroke, thereby keeping the teeth of rake free at all times.

I attain this by a mechanism illustrated in the accompanying drawing in which—

Figure 1 is a front elevational view of the attachment applied to a rake.

Figure 2 is a perspective view of entire mechanism detached from the rake.

Figure 3 is a top view of horizontal bar showing end sections and perforations at point indicated by line 3—3 Fig. 2.

Figure 4 is a sectional view at line indicated by 4—4 Fig. 1, showing manner in which spring is clamped to back of rake.

Figure 5 is a top sectional view of mechanism as indicated by 5—5 Fig. 1.

The mechanism consists of two principal parts. The first is a horizontal bar B (preferably in the form of a channel, to give lateral strength), having a series of perforations B' B', so spaced as to allow passage of teeth of the rake, each end of horizontal bar being bent upward at a point immediately beyond the end of the rake, forming a vertical section C at a ninety degree angle to horizontal bar. Each of the vertical sections has an oblong perforation in its upper end, through which passes the tenon G on the end of a flat straight spring D, which is clamped in a lateral position along the back of rake K, vertical sections being held in position by cotter keys F F in the ends of spring. The vertical sections C C are made slightly shorter than the depth of the rake from its back to the points of the teeth, to prevent perforated bar B from slipping off the teeth when spring D is at rest.

The second principal part of the mechanism is a flat straight spring D, of the approximate width of the back of the rake, and slightly longer than the length of the rake. Each corner of the spring is so notched as to form a shoulder and tenon G, a small perforation being made in end of tenon for the insertion of cotter key F. The spring is clamped to the back of rake K with two clamps (or preferably U bolts) E E, the clamps being placed at a sufficient distance from the ends of the spring to admit of a free vertical movement of the ends of spring, thereby allowing a vertical reciprocating movement of the perforated stripper bar B as spring D flexes and straightens alternately. The spring is articulated with the upper ends of sections C C of bar B by tenon G passing through perforations in C C, and is held in position by cotter keys F F in the ends of spring. The spring being slightly longer than the length of the rake prevents friction of sections C C against the ends of rake K, which otherwise would result, due to the shortening of the linear distance between the ends of spring and the clamps when the spring is flexed. Spring is held in position on head of rake by two clamps E E. Clamp has one horizontal and two vertical elements, as shown in Fig. 2, vertical sections being provided with perforations H' H', through which passes stove bolt H to hold clamp in position in manner indicated in Fig 4. (U bolt may be substituted for this part.)

When raking, substances accumulating on the teeth of the rake force bar B upward to a point indicated by horizontal dotted line in Fig. 1. Bar B having two rigid vertical sections C C, one at each end, articulated with spring D forces said spring upward to position indicated by dotted curved lines Fig. 1. When the rake is lifted and pressure removed recoil of spring forces bar B downward to the points of the teeth of the rake, expelling accumulated substances from the teeth, thereby automatically freeing the teeth of any accumulation at the end of each stroke.

I claim:—

1. A rake cleaner comprising a bar provided with spaced rake teeth openings, integral upstanding ends provided with oblong openings in the upper parts thereof, a flat straight spring secured to the rake head provided with reduced portions passed through the oblong openings, and means for locking the reduced portions in said openings.

2. A rake cleaner comprising a perforated bar having integral upturned ends, provided with openings near their upper ends, a flat straight spring provided with end tenons passed through the openings in the bar ends, and cotter pins passed through perforations in said tenons.

3. A rake cleaner comprising a flat straight spring having reduced ends, means for clamping said spring at several places to the head of a rake, a perforated stripper bar having integral upturned ends each provided with an opening in its upper part, means for securing the reduced portions of the spring in the openings of the upturned ends to prevent binding of said ends with the sides of the rake.

JOHN R. SEATON.